(12) United States Patent
Mazzarolo

(10) Patent No.: US 7,460,886 B2
(45) Date of Patent: Dec. 2, 2008

(54) GARMENT HAVING PROTECTIVE INFLATABLE DEVICES

(75) Inventor: Giovanni Mazzarolo, Coste di Maser (IT)

(73) Assignee: Alpinestars Research SrL, Treviso (IT)

(*) Notice: Subject to any disclaimer, the term of this patent is extended or adjusted under 35 U.S.C. 154(b) by 170 days.

(21) Appl. No.: 10/575,944

(22) PCT Filed: Feb. 13, 2004

(86) PCT No.: PCT/IT2004/000056

§ 371 (c)(1),
(2), (4) Date: Apr. 13, 2006

(87) PCT Pub. No.: WO2005/077213

PCT Pub. Date: Aug. 25, 2005

(65) Prior Publication Data

US 2007/0147272 A1 Jun. 28, 2007

(51) Int. Cl.
*H04J 3/00* (2006.01)

(52) U.S. Cl. .................... 455/556.2; 2/69; 280/733

(58) Field of Classification Search .......... 455/556.2; 2/69; 280/733
See application file for complete search history.

(56) References Cited

U.S. PATENT DOCUMENTS

| | | | | |
|---|---|---|---|---|
| 4,685,151 A | * | 8/1987 | Kincheloe | 2/456 |
| 4,977,623 A | * | 12/1990 | DeMarco | 2/456 |
| 5,155,376 A | * | 10/1992 | Okano | 307/10.1 |
| 5,873,131 A | * | 2/1999 | Sabin | 2/69 |
| 5,984,350 A | * | 11/1999 | Hagan et al. | 280/735 |
| 6,032,299 A | | 3/2000 | Welsh | |
| 6,154,463 A | * | 11/2000 | Aggarwal et al. | 370/408 |
| 6,198,996 B1 | * | 3/2001 | Berstis | 701/36 |
| 6,260,196 B1 | * | 7/2001 | van der Sleesen | 2/2.5 |
| 6,345,839 B1 | | 2/2002 | Kuboki et al. | |
| 6,722,691 B1 | * | 4/2004 | Håland et al. | 280/730.1 |
| 6,786,028 B1 | * | 9/2004 | Longtin | 54/79.2 |
| 6,951,033 B2 | * | 10/2005 | Dainese | 2/69 |
| 7,011,175 B2 | * | 3/2006 | Link et al. | 180/274 |
| 2002/0020990 A1 | * | 2/2002 | Sinnhuber et al. | 280/729 |
| 2002/0057915 A1 | * | 5/2002 | Mann | 396/661 |
| 2003/0146610 A1 | * | 8/2003 | Chang et al. | 280/735 |
| 2004/0111790 A1 | * | 6/2004 | Dainese | 2/456 |
| 2004/0126615 A1 | * | 7/2004 | Mortz et al. | 428/690 |

(Continued)

FOREIGN PATENT DOCUMENTS

EP 0 982 200 3/2000

OTHER PUBLICATIONS

International Search Report dated Sep. 10, 2004.

*Primary Examiner*—Matthew D. Anderson
*Assistant Examiner*—Hai V Nguyen
(74) *Attorney, Agent, or Firm*—Katten Muchin Rosenman LLP

(57) ABSTRACT

A garment is provided with at least one inflatable protecting device, adapted to be worn by a person travelling on a motorcycle or the like, includes a radio receiver, a trigger circuit and non-volatile memories. A programmable logic unit interfacing with the radio receiver and communicating with remote radio transmitters mounted on a motorcycle or the like through an identification code, manages and stores in the memories the identification codes detected by the radio receiver. The wearer of the garment can in this way select, via an interface, a code among those available in the memory. In an accident, the air bags actuate.

13 Claims, 2 Drawing Sheets

U.S. PATENT DOCUMENTS

| | | | |
|---|---|---|---|
| 2005/0000748 A1* | 1/2005 | Link et al. | 180/282 |
| 2005/0193742 A1* | 9/2005 | Arnold | 62/3.5 |
| 2005/0230947 A1* | 10/2005 | Chen | 280/735 |
| 2006/0154642 A1* | 7/2006 | Scannell, Jr. | 455/404.1 |
| 2006/0176660 A1* | 8/2006 | Amiri | 361/683 |
| 2007/0044197 A1* | 3/2007 | Turcotte et al. | 2/69 |
| 2007/0291473 A1* | 12/2007 | Traynor | 362/106 |
| 2008/0010729 A1* | 1/2008 | Delara | 2/455 |
| 2008/0147231 A1* | 6/2008 | Fernandez | 700/138 |

* cited by examiner

GARMENT HAVING PROTECTIVE INFLATABLE DEVICES

CROSS-REFERENCE TO RELATED APPLICATION

This application is a National Phase of PCT International Application No. PCT/IT2004/000056, filed on Feb. 13, 2004, now International Publication WO 2005/077213, the contents of which are hereby incorporated by reference.

DESCRIPTION

The present invention refers to a garment incorporating inflatable protective devices that are commonly known and referred to as airbags.

Throughout the last few years, a lot of activities have been and are still being carried out, not only at a research and development level, but also at an industrial one, although on a relatively small scale, which share the main object of maximizing protection against bumps and shocks, even of a violent nature, of persons practicing sports and non-sports activities that involve high-speed displacements without any cabin, driver's compartment or other structure which to rely upon for protection. In particular, motorcyclists, not only those involved in sports or similar racing activities, but also those who travel on road, covering more or less long distances riding on medium-to-high powered motorcycles, form a major consumer segment, which such activities are addressed to.

In the following description, reference will be made, merely for a greater simplicity, to the motorcyclists' category, whereas the term motorcycle is meant in this context to cover and include any other such motive means as motorboats, racehorses, and the like, on which a person may perform or practice any of the above-cited activities.

Garments provided with or associated to airbags have already been introduced on the market, in which said airbags are intended to be triggered automatically upon appropriate sensors detecting a condition of very high risk potentially existing in the case of bump, collision and/or particularly abrupt, violent braking.

Solutions have been at first proposed, in which the connection between the sensors (and possible electronic control units) arranged on the motorcycle and the airbags typically consisted of a cable. Such cable, however, turns out as being much of an inconvenience for the motorcyclist, owing to its being both a hindrance and a constraint. Moreover, safety problems may arise if this connection cable happens to accidentally break or fail, entraining complex handling to deal with the resulting emergency condition. Similar problems may also arise from the cable wearing down with time.

A proposal has been put forward more recently for the data detected by the sensors to be transmitted to the airbag inflation triggering devices by radio signals.

The use of a radio communication system, in which the decision to trigger the airbags is taken based on the signals sent by sensors that are arranged also or solely on the motorcycle, leads to a full set of new considerations. Further to the more obvious and generally known ones (which shall not be dealt with here any further) concerning the need for a reliable radio communication channel to be anyway ensured, many other problems must in fact be tackled in this connection, such as:

A. making it possible for a motorcyclist to be able to use various motorcycles that are equipped with a similar safety system (this is the case for example when someone uses more than a single motorcycle);

B. making it possible for a motorcyclist to be able to use various protective garments while using a single and same motorcycle equipped with a similar safety system (as this would be for instance the case when a garment breaks down or is lost);

C. making the radio communication channel between a motorcycle and the garment worn by the user unaffected by interferences of radio signals emitted by other motorcycles or other garments that are equipped with a similar safety system (as this may for instance be the case of the system exception in which two distinct persons are riding on two motorcycles travelling side-by-side);

D. making it possible for two persons to use the same motorcycle at the same time, both of them wearing a protective garment, and the control of the airbag provisions to be differentiated according to the position occupied by said two persons on the motorcycle (i.e. driver or passenger);

E. ensuring a protective effect even when the motorcycle is at a standstill, in the case it is bumped into, for instance as it is stopping when approaching a crossroad.

These requirements are considered in part, and anyway just as far as those indicated under B and C above are concerned, in the patent application no. WO 018 1 128, where it is suggested that the radio transmission be provided with an appropriate coded protocol by associating a code generator and a code recogniser to the radio transmitter and the radio receiver, respectively. More specifically, in the system described in this patent application:

reference is only made to a code generation and a code recognition between transmitter and receiver, without any logic control unit for managing the code itself;

the logic unit available in the system is in fact solely used to analyse the data being sent by the sensors on the motorcycle to the airbag triggering unit;

upon ignition of the motorcycle engine, the transmitter sends to the receiver its identification code, with which it is tuned up. This enables a mutual recognition and an efficient transmission. In this circumstance, however, the transmitter is a passive element; except for accepting the code of the transmitter, it does not allow for any possibility for the user to take any action on the system;

no indication is given on how system's exceptions (for example, the exception cited above under C) can be practically handled and solved, apart from a general suggestion, according to which use should be preferably made of a cable connection. No explanation is anyway given on how this connection should actually be made, nor descriptions of any alternative embodiments are proposed;

the display used as a part of this system does not provide any information on the state of the radio transmission and does not include any means for the user to intervene on the management of transmission codes.

It therefore is a main object of the present invention to provide a garment equipped with inflatable protective means (airbags), which is capable of solving all of the problems set forth under A through to E above, without the limitations indicated of the above-mentioned patent application.

According to the present invention, this aim is reached in a garment provided with inflatable protective means incorporating the characteristics as recited in the appended claims, i.e.:

the garment is fitted with inflatable protection devices, a controlled trigger system for said devices, and a radio receiver equipped with a decoder adapted to communicate with an associate radio transmitter equipped with an encoder which is arranged on the motorcycle used by the wearer of the garment;

to said garment there is associated a logic unit, connected to input/output means for the user, which is adapted to acquire information about the communication code from said radio receiver, to correspondingly process said information, and to enable the mutual recognition of the garment and the motorcycle to be managed and performed automatically and/or manually, through said input/output means, under all circumstances as set forth under A through to E above.

A garment featuring the characteristics of the appended claims enables not only the above listed aims, but also further ones to be reached, as this will become apparent from the following description of a preferred, but not unique embodiment of the invention in the form of a motorcycling jacket, with reference to the accompanying drawing, in which:

Figure 1:
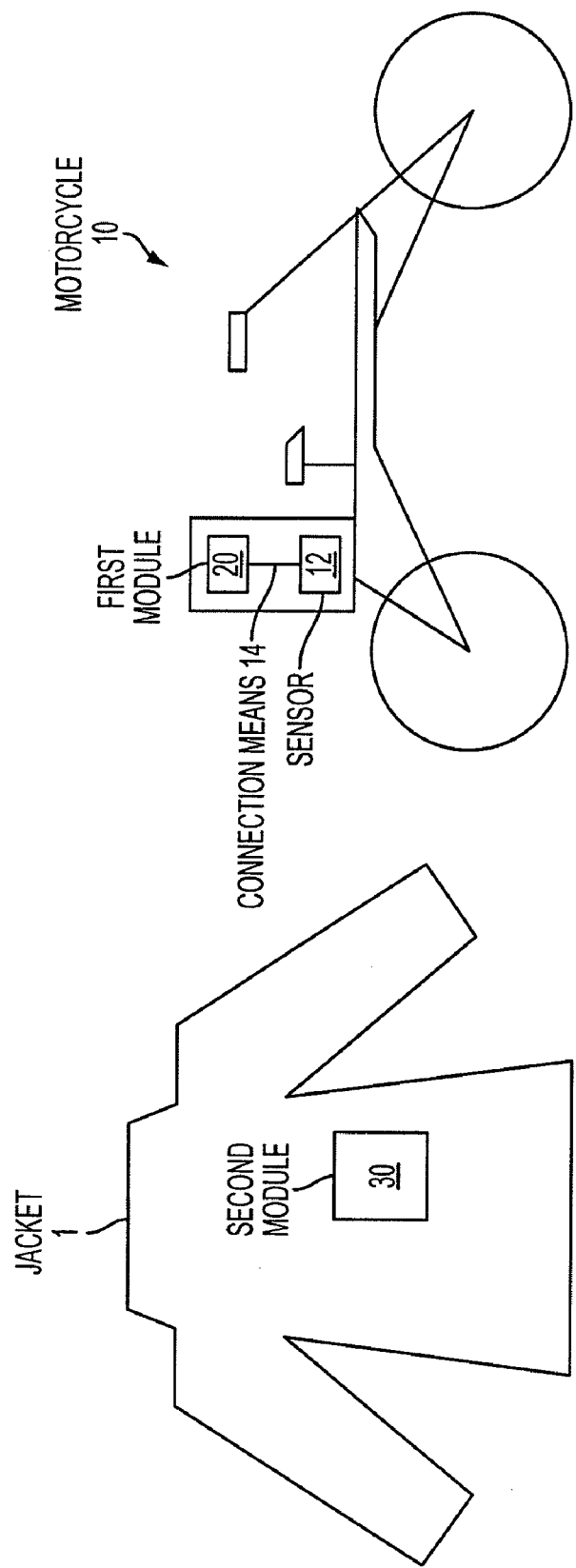
FIG. 1 is a schematical view of a motorcycling jacket and a motorcycle according to the present invention.

In FIG. 1 a jacket 1 adapted to be worn by a person riding an associated motorcycle 10. The invention enables a many-to-one interaction to be managed between the jacket 1 and the motorcycle 10 and vice-versa; for a greater simplicity, the case of a single jacket 1 associated to a single motorcycle 10 is considered in FIG. 1. On said motorcycle 10 there is provided a first functional module 20 associated to a second functional module 30 provided on the jacket 1. Sensors, as generally indicated at 12, are provided on the motorcycle 10 and are connected to said module 20 via generally known connection means 14 (e.g. copper conductors, optical waveguide fibers, and the like).

Figure 2:
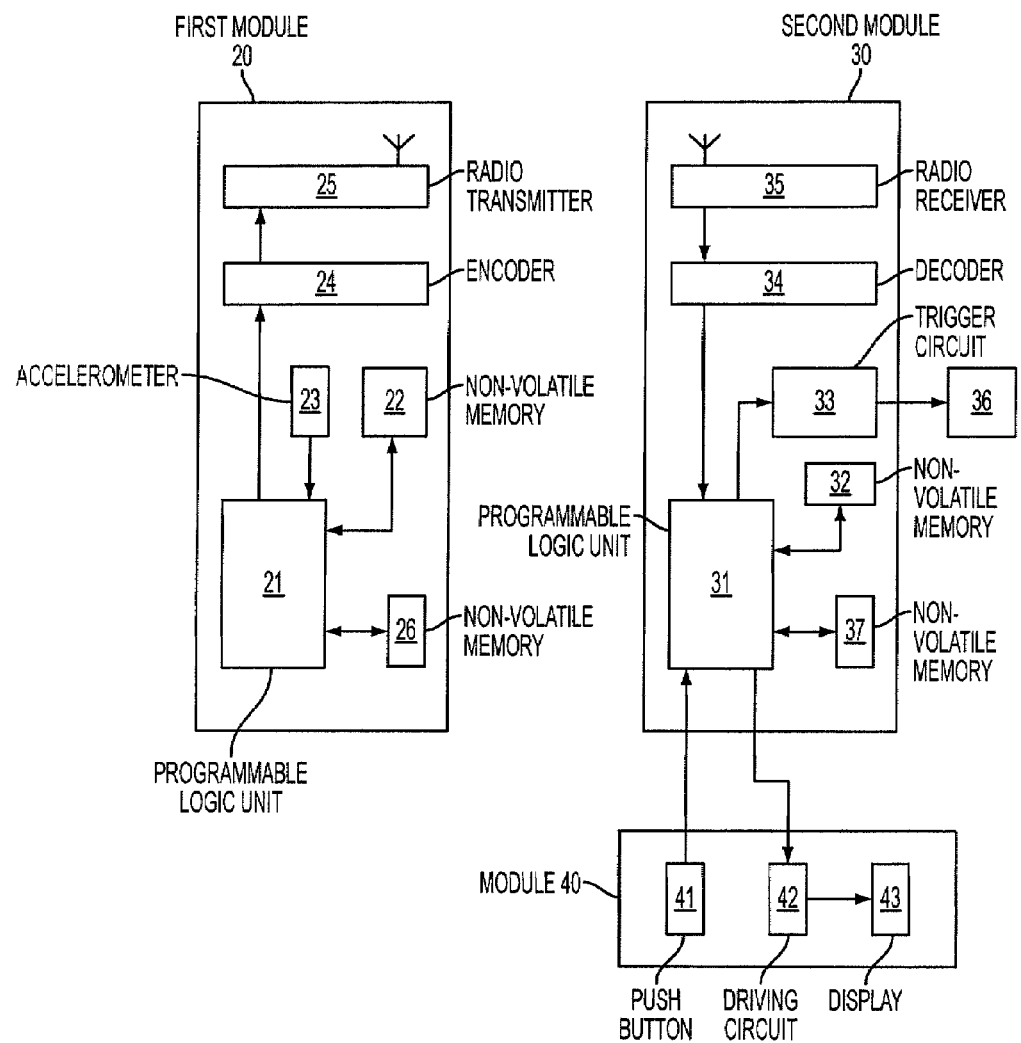
FIG. 2 is a block diagram of the functional elements of FIG. 1.

As regards the actual contents of said modules reference is made to FIG. 2. Using generally known techniques, the module 20 acquires the information flowing in from the sensors 12 and processes said information through a programmable logic unit 21, which in parallel thereto also processes the information flowing in from an accelerometer 23 (which may be implemented in an integrated form, e. g. the type ADXL210 by Analog Devices). A first non-volatile memory 22 (where the serial code identifying the individual module 20 used for the radio communication is stored) and a second non-volatile service memory 26 (which may be provided either inside or outside said unit 21) are accessible by said logic unit 21. The logic unit reads said serial code and submits it to an encoder 24, which drives a radio-transmitting stage 25. In FIG. 2, the connections of the various functional blocks with each other are indicated in the form of arrows for greater clarity and simplicity. Anyway they may be implemented by any suitable means known in the art, such as data buses on PCB.

The second module 30 includes a programmable logic unit 31 connected via generally known means to: a non-volatile memory 32 for saving said serial code being so assigned on an exclusive basis to each single module 20, a trigger circuit 33 for triggering the inflating devices 36 associated to the airbags (not shown, also provided on the jacket 1), a decoder 34, and a non-volatile service memory 37. In turn, the decoder 34 is connected to a radio receiver 35. Associated to the second module 30 there is a third user-interface module 40 (which is implemented as an external module in this embodiment, but could as well be integrated in the second module 30), which comprises push-buttons 41 for manual control, and a driving circuit 42 for a display 43 (e. g. a liquid-crystal or a light-emitting segment display).

The modules 20 and 30 are energized by respective power-supply units (not shown) of any suitable kind known in the art, e. g. batteries, photovoltaic cells, etc.

The recognition process between jacket 1 and motorcycle 10 is now described in detail. When the module 20 is energized, the logic unit 21 reads from the memory 22 the serial code identifying the same module 20 and subsequently enters a stand-by cycle.

Starting from the ignition of the motorcycle 10, as far as said module 20 is concerned, operations follow each other cyclically in the sequence described below:

I. the logic unit 21 sends the identifying serial code to the encoder 24, which will set the transmitter 25 accordingly so as to start emitting radio signals comprising the code and a READY signal;

II. the logic unit 21, via sensors of a per se known type (not shown), checks whether the motor of the motorcycle 10 is ignited;

III. if the engine of the motorcycle 10 is detected as not actually running, the logic unit starts again from step I; otherwise it performs an operation to check whether the stand of the motorcycle 10 is raised;

IV. if the stand of the motorcycle 10 is detected as not being raised, the logic unit starts again from step I; otherwise it reads the data supplied by the accelerometer 23 and compares them with pre-set threshold values;

V. if said pre-set threshold values are not detected as being exceeded, the logic unit starts again from step I; if threshold values are exceeded, so that a situation of serious risk for the safety of the person wearing the jacket 1 may be assumed to exist, the logic unit saves said data in the non-volatile memory 26 and sends, via the encoder 24—transmitter 25 cascade, a danger signal to the module 30.

As far as the module 30 is concerned, soon after its energization (preferably by a battery of its own) it enters an inactive state involving a very low energy consumption. When one of the push-buttons 41 is depressed, the logic unit 31 checks the value of the supply voltage and, via the receiver 35 and the decoder 34, searches out a valid identifying serial code, as transmitted by a corresponding module 20. If the logic unit 31 finds one or more serial codes, it stores them in the non-volatile memory 37 and shows them on the display 43 through the associated driving circuit 42. With the help of the push-buttons 41, the user is at this point able to select among the codes being displayed the one that corresponds to a given module 20 (and, therefore, to a given motorcycle 10). In view of simplifying the process of associating the modules 20 and 30 with each other, the logic unit 31, while analysing the values stored in the memory 37, will in the first place show on the display 43 the last code in use.

In the case that the logic unit 31 receives, via the receiver 35 and the decoder 34, a danger signal from a module 20, (which the user has associated with the module 30 provided on the jacket through the above-described enabling procedure) it activates the circuit 33, thereby causing the devices 36 to trigger and, as a result, the airbags to inflate.

According to a feature of the invention, such inflation of the airbags may take place in a programmable manner. In fact, in the case that the driver is not travelling alone on a motorcycle 10, but is carrying a passenger with him/her, who is also wearing a jacket 1 recognized by the same motorcycle 10 (and, therefore, by the module 20 thereof), a problem arises in that both of them should be ensured an adequate extent of protection. In other words, in the case of an accident, the sudden inflation of the airbags actually has to take place in a manner not causing a damage to any of the two motorcyclists. Therefore, through the push-buttons 41 and the display 43 of the module 40, each wearer of a jacket 1 is able to select which of his/her airbags shall be actually permitted to inflate. For example, if the jacket 1 is provided with a front and a rear airbag, the driver will select that only the front one of his/her own airbags is permitted to inflate in the case of an accident, while the passenger will select that only his/her rear one is permitted to inflate. This is in fact allowed for by the versatility of the logic unit 31 and the triggering commands being separated in the circuit 33 for the various airbags forming the inflatable protection devices of the invention.

Further functions may actually be contemplated for the module 30, e.g. a low-energy consumption mode of operation controlled by the module 20 or safety checks to be run in the case that the identification signal is not being detected during a pre-set period of time or in the case that the battery voltage becomes insufficient. The module 40 may then be provided with either sound or mechanical (e.g. vibratory) alarm means to call the attention of the user on the existence of said problems.

It should be noticed that, according to another feature of the invention, the procedure performed as set forth under step V above enables, in the case of dangerous events and/or collisions, the acceleration value at the moment of the accident to be retrieved from the data stored in said non-volatile memory 26.

From the description given above, it readily appears that the present invention is actually capable of reaching all of its aims as set forth hereinbefore, both in the embodiment thereof that has been described here and in the many possible variants thereof that are protected by the appended claims, wherein said variants include the case in which the logic unit 31, which intervenes in managing and controlling the transmission codes, and the user-interface module 40 may be provided on the motorcycle 10 rather than on the jacket 1.

The invention claimed is:

1. A garment for protection against bumps and shocks for a user traveling on a moving means;
said moving means having therein mounted sensor means and a first functional module, said first functional module comprising a first power supply unit, a first programmable logic unit for reading an identification serial code signal, a first non-volatile memory for storing said identification serial code signal identifying said first functional module, and a radio transmitter;
said garment comprising
an inflatable protective device,
a second functional module comprising a second power supply unit, a second programmable logic unit, and
a radio receiver connected to said second programmable logic unit, said radio receiver being associated with said radio transmitter mounted on said moving means,
a trigger circuit for activating said inflatable protective device in response to a danger radio signal received from said radio transmitter,
a second non-volatile memory for managing and storing said identification serial code signal received from said first functional module,
a third functional module associated with said second functional module, said third functional module and comprising at least one push-button, a display, and a related driving circuit;
wherein said third functional module is used by the user to select said identification serial code signal identifying said first functional module in order to activate said inflatable protective device when danger occurs.

2. The garment of claim 1, wherein said third functional module is integrated in said second functional module.

3. The garment of claim 1, wherein said third functional module is external to said second functional module.

4. The garment of claim 1, wherein said radio receiver comprises a radio receiving unit and a decoder.

5. The garment of claim 1, wherein said display shows said serial code stored in said second non-volatile memory.

6. The garment of claim 1, wherein said second power supply comprises a battery disposed in said garment for energizing said second functional module.

7. The garment of claim 1, wherein said second programmable logic unit is able to operate in a state of low energy consumption.

8. The garment of claim 1, further comprising a second inflatable protective device, said third interface module sending a control signal to select which of said inflatable protective devices are to be inflated when danger occurs.

9. The garment of claim 1, wherein said second programmable logic unit comprises a safety checks of said second voltage supply.

10. The garment of claim 1, wherein said second programmable logic unit interfaces with sound or mechanical alarm indicators.

11. The garment of claim 1, wherein said garment is configured as a motorcycling jacket.

12. A garment for protection against bumps and shocks for a user travelling on one of a plurality of moving means;
each of said moving means having therein mounted respective sensor means and a respective first functional module, said first functional module comprising a first power supply unit, a first programmable logic unit for reading one of a plurality of identification serial code signals, a first non-volatile memory for storing said one of a plurality of identification serial code signals, and a radio transmitter, each serial code uniquely identifying said respective first functional module;
said garment comprising
an inflatable protective device,
a second functional module comprising a second power supply unit, a second programmable logic unit, and
a radio receiver connected to said second programmable logic unit, said radio receiver being associated with said radio transmitter mounted on said moving means,
a trigger circuit for activating said inflatable protective device in response to a danger radio signal received from said radio transmitter,
a second non-volatile memory for managing and storing at least two of said plurality of identification serial code signals,
a third functional module associated with said second functional module, said third functional module and comprising at least one push-button, a display, and a related driving circuit;
wherein said third functional module is used by said user to select said one of said plurality of identification serial code signals identifying said first functional module associated with said moving means selected by said user for use while wearing said garment in order to activate said inflatable protective device when danger occurs while using said moving means.

13. A system for protection against bumps and shocks for a user travelling on one of a plurality of moving means; the system comprising:

sensor means and a respective first functional module mounted on each of said moving means, said first functional module comprising a first power supply unit, a first programmable logic unit for reading one of a plurality of identification serial code signals, a first non-volatile memory for storing said one of a plurality of identification serial code signals, and a radio transmitter, each serial code uniquely identifying said respective first functional module;

a garment comprising an inflatable protective device, a second functional module comprising a second power supply unit, a second programmable logic unit, and a radio receiver connected to said second programmable logic unit, said radio receiver being associated with said radio transmitter mounted on said moving means, a trigger circuit for activating said inflatable protective device in response to a danger radio signal received from said radio transmitter, a second non-volatile memory for managing and storing at least two of said plurality of identification serial code signals, a third functional module associated with said second functional module, said third functional module and comprising at least one push-button, a display, and a related driving circuit;

wherein said third functional module is used by said user to select said one of said plurality of identification serial code signals identifying said first functional module associated with said moving means selected by said user for use while wearing said garment in order to activate said inflatable protective device when danger occurs while using said moving means.

* * * * *